(12) United States Patent
Halageri et al.

(10) Patent No.: US 12,461,804 B2
(45) Date of Patent: Nov. 4, 2025

(54) PERIODICALLY DETERMINING A STACK ERROR USING A DIRECT MEMORY ACCESS CALL

(71) Applicant: Microchip Technology Incorporated, Chandler, AZ (US)

(72) Inventors: Avinash Halageri, Karnataka (IN); Swathi G. Bhat, Karnataka (IN)

(73) Assignee: Microchip Technology Incorporated, Chandler, AZ (US)

( * ) Notice: Subject to any disclaimer, the term of this patent is extended or adjusted under 35 U.S.C. 154(b) by 29 days.

(21) Appl. No.: 18/746,687

(22) Filed: Jun. 18, 2024

(65) Prior Publication Data
US 2025/0335281 A1  Oct. 30, 2025

(30) Foreign Application Priority Data
Apr. 29, 2024 (IN) .............................. 202411034017

(51) Int. Cl.
*G06F 11/00* (2006.01)
*G06F 11/07* (2006.01)

(52) U.S. Cl.
CPC ........ *G06F 11/0754* (2013.01); *G06F 11/073* (2013.01)

(58) Field of Classification Search
CPC ........................... G06F 11/073; G06F 11/0754
See application file for complete search history.

(56) References Cited

U.S. PATENT DOCUMENTS

| 5,953,741 A | 9/1999 | Evoy et al. ................... 711/132 |
| 6,606,743 B1 | 8/2003 | Raz et al. ..................... 717/148 |
| 2014/0359246 A1* | 12/2014 | Park ..................... G06F 3/0653 711/170 |
| 2016/0381050 A1* | 12/2016 | Shanbhogue ........... G06F 21/52 726/23 |
| 2020/0285606 A1* | 9/2020 | Grant .................. G06F 11/3476 |
| 2023/0044935 A1* | 2/2023 | Madineni ............ G06F 11/3442 |

OTHER PUBLICATIONS

International Search Report and Written Opinion, Application No. PCT/US2024/053168, 10 pages.

* cited by examiner

*Primary Examiner* — Marc Duncan
(74) *Attorney, Agent, or Firm* — SLAYDEN GRUBERT BEARD PLLC

(57) ABSTRACT

Systems and methods for periodically determining a stack error using a direct memory access (DMA) call are provided. The method may include periodically determining whether a stack pointer is beyond a limit in a stack through a direct memory access (DMA) call. The method may additionally include identifying a stack error based on a determination that the stack pointer is beyond the limit in the stack. In the method, a periodicity of the determination of whether the stack pointer is beyond the limit in the stack through the DMA call may be based on a size of space between the stack pointer and the limit in the stack.

20 Claims, 7 Drawing Sheets

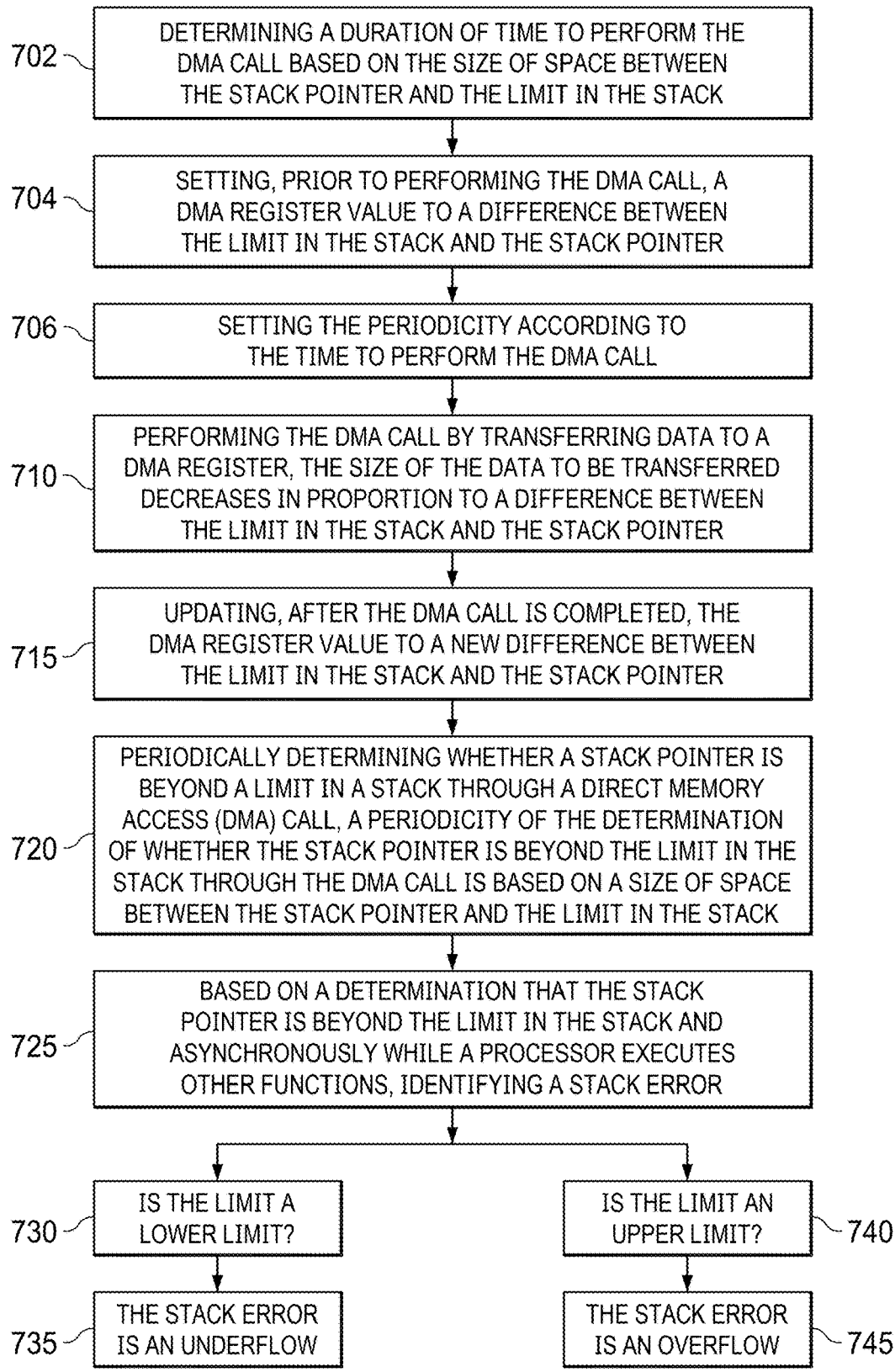

PERIODICALLY DETERMINING A STACK ERROR USING A DIRECT MEMORY ACCESS CALL

PRIORITY

This application claims priority to Indian Provisional Patent Application No. 202411034017, filed Apr. 29, 2024, the contents of which are hereby incorporated in their entirety.

TECHNICAL FIELD

The present disclosure relates to a direct memory access (DMA) transfer mechanism and, in particular, to periodically determining a stack error using a direct memory access call.

BACKGROUND

Direct memory access (DMA) control circuits are typically used in microprocessor systems, integrated microcontrollers, and similar devices to perform data transfer from, and to, memory and to, and from, a peripheral independently from the processor of the computer system. DMA control circuits use a stack to perform operations including function calls, interrupts, and exceptions. The stack holds the return addresses needed when invoking a function. On occasion, the DMA control circuit may experience stack overflow or stack underflow. A stack underflow is a condition where a stack pointer refers an address that is not in the stack. In the microprocessor system, undefined behavior may occur in the processor, as the address to jump to is not valid. A stack overflow is an opposite condition and can occur if the stack pointer exceeds the random access memory (RAM) address range reserved for the call stack. The processor in the microcontroller may also exhibit undefined behavior in this case.

One method of detection of stack overflow and underflow conditions is by defining a guard band with a predefined data pattern at the upper and lower ends of the stack, respectively. A DMA control circuit may periodically determine whether the data pattern has been overwritten, and, if the data pattern has been over written, a stack overflow or underflow condition has occurred. However, it is impossible to know when the data pattern was overwritten. Additionally, the timing of detection of a stack overflow or underflow condition depends on how often the DMA control circuit scans the guard bands. Further, if the guard band region is intentionally overwritten by some data, e.g., by another program, a false detection may occur.

A second method of detection of stack overflow and underflow conditions is by comparing the stack pointer to a guard band address for a given function. For example, stack overflow and underflow detection is provided by using a stack pointer limit value register (SPLIM) as the upper boundary and 0x1000 as the lower boundary. However, if the stack is moved to a different location in static RAM (SRAM), stack underflow detection becomes ineffective.

SUMMARY OF THE INVENTION

Examples of the present disclosure may include a method. The method may include periodically determining whether a stack pointer is beyond a limit in a stack through a direct memory access (DMA) call. The method may additionally include identifying a stack error based on a determination that the stack pointer is beyond the limit in the stack. In the method, a periodicity of the determination of whether the stack pointer is beyond the limit in the stack through the DMA call may be based on a size of space between the stack pointer and the limit in the stack.

In combination with any of the above examples, the limit may be a lower limit and the stack error may be an underflow.

In combination with any of the above examples, the limit may be an upper limit and the stack error may be an overflow.

In combination with any of the above examples, the method may further include determining a time to perform the DMA call based on the size of space between the stack pointer and the limit in the stack and setting the periodicity according to the time to perform the DMA call.

In combination with any of the above examples, the determination of whether the stack pointer is beyond the limit in the stack through the DMA call may be performed asynchronously while a processor executes other functions.

In combination with any of the above examples, the DMA call may transfer data to a DMA register and a size of data to be transferred may decrease in proportion to a difference between the limit in the stack and the stack pointer.

In combination with any of the above examples, the method may further include setting, prior to performing the DMA call, a DMA register value to a difference between the limit in the stack and the stack pointer; and updating, after the DMA call is completed, the DMA register value to a new difference between the limit in the stack and the stack pointer.

Alone or in combination with any of the above examples, examples of the present disclosure may include an apparatus. The apparatus may include a direct memory access (DMA) control circuit. The control circuit may be to periodically determine whether a stack pointer is beyond a limit in a stack through a DMA call. The control circuit may also be to identify a stack error based on a determination that the stack pointer is beyond the limit in the stack. The control circuit may base a periodicity of the determination of whether the stack pointer is beyond the limit in the stack through the DMA call on a size of space between the stack pointer and the limit in the stack.

In combination with any of the above examples, the limit may be a lower limit and the stack error may be an underflow.

In combination with any of the above examples, the limit may be an upper limit and the stack error may be an overflow.

In combination with any of the above examples, the DMA control circuit may further be to determine a time to perform the DMA call based on the size of space between the stack pointer and the limit in the stack and set the periodicity according to the time to perform the DMA call.

In combination with any of the above examples, the determination of whether the stack pointer is beyond the limit in the stack through the DMA call may be performed asynchronously while a processor executes other functions.

In combination with any of the above examples, the DMA call may transfer data to a DMA register and a size of data to be transferred may decrease in proportion to a difference between the limit in the stack and the stack pointer.

In combination with any of the above examples, the DMA control circuit may be further to set a DMA register value to a difference between the limit in the stack and the stack pointer and update the DMA register value after the DMA call is completed.

Alone or in combination with any of the above examples, examples of the present disclosure may include an article of manufacture. The article of manufacture may include a non-transitory memory including machine-readable instructions that, when executed by a processor, cause the processor to periodically determine whether a stack pointer is beyond a limit in a stack through a direct memory access (DMA) call. The machine-readable instructions may also cause the processor to identify a stack error based on a determination that the stack pointer is beyond the limit in the stack. The processor may base a periodicity of the determination of whether the stack pointer is beyond the limit in the stack through the DMA call on a size of space between the stack pointer and the limit in the stack.

In combination with any of the above examples, the limit may be a lower limit and the stack error may be an underflow.

In combination with any of the above examples, the limit may be an upper limit and the stack error may be an overflow.

In combination with any of the above examples, the machine-readable instructions may further cause the processor to determine a time to perform the DMA call based on the size of space between the stack pointer and the limit in the stack and set the periodicity according to the time to perform the DMA call.

In combination with any of the above examples, the DMA call may transfer data to a DMA register and a size of data to be transferred may decrease in proportion to a difference between the limit in the stack and the stack pointer.

In combination with any of the above examples, the machine-readable instructions may further cause the processor to set a DMA register value to a difference between the limit in the stack and the stack pointer and update the DMA register value after the DMA call is completed.

BRIEF DESCRIPTION OF THE DRAWINGS

The figures illustrate examples of systems and methods.

FIG. 7 illustrates a method for periodically determining a stack underflow or overflow condition using a DMA call, according to examples of the present disclosure.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to an aspect of the invention, systems and methods for periodically determining a stack error using a direct memory access (DMA) call are provided. The systems and methods provide more timely detection of stack overflow or underflow by adaptively tracking a current stack pointer such that the intensity of tracking the current stack pointer increases as the current stack pointer approaches an upper limit or a lower limit indicating a stack overflow or underflow, respectively. The disclosed systems and methods may be used in any application running on a processor that implements early detection of stack overflow or underflow conditions. For example, the disclosed system and methods may be used in electronic control units (ECUs) for automotive applications to ensure compliance with International Organization for Standardization (ISO) 26262, Part 5, Section D.2.3.8.

The following acronyms may be used throughout this disclosure.

| Acronym | Explanation |
| --- | --- |
| DMA | Direct Memory Access |
| CPU | Central Processing Unit |
| ECU | Electronic Control Unit |
| SP | Stack Pointer |
| SPLIM | Stack Pointer Limit Value Register |
| SRAM | Static Random-Access Memory |
| PC | Program Counter |
| DMAH | DMA High Address Limit Register |
| DMAL | DMA Low Address Limit Register |
| DMABUF | DMA Data Buffer Register |
| DMASRC | DMA Channel Source Address Register |
| DMADST | DMA Channel Destination Address Register |
| DMACNT | DMA Channel Count Register |
| ISR | Interrupt Service Routine |
| HIGHIF | DMA High Address Limit Interrupt Flag |
| LOWIF | DMA Low Address Limit Interrupt Flag |
| DONEIF | DMA Complete Operation Interrupt Flag |

Figure 1:
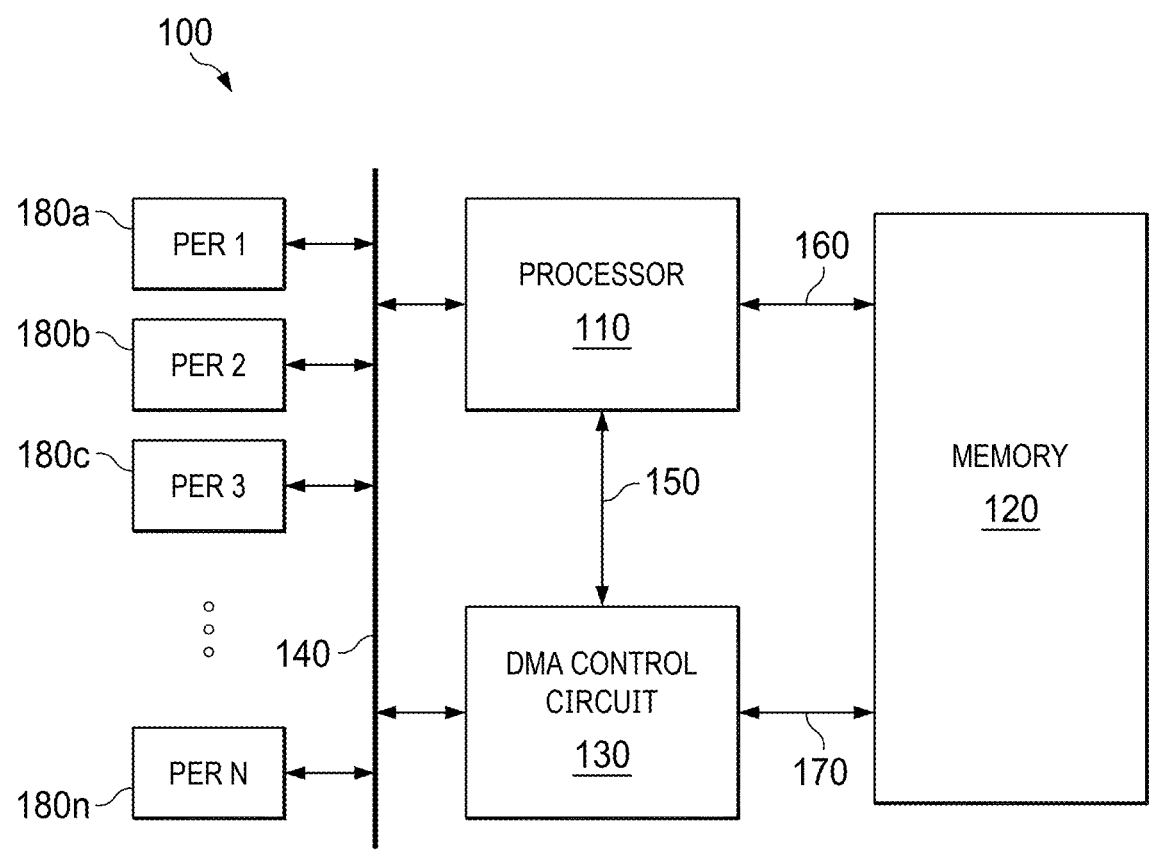
FIG. 1 is an illustration of a system for periodically determining a stack error using a DMA call, according to examples of the present disclosure.

FIG. 1 is an illustration of a system for periodically determining a stack error using a DMA call, according to examples of the present disclosure. System 100, such as for example a microcontroller, may include processor 110 coupled to one or more bus systems, such as bus 140. Processor 110 may be a central processing unit (CPU), a general purpose processor, a specific purpose processor, a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. Through bus 140, processor 110 may communicate with a plurality of peripheral devices 180a through 180n, such as input/output (I/O) ports, memories; analog to digital (A/D) and digital to analog (D/A) converters, timers, and pulse width modulators. Additionally, dedicated memory bus 160 may couple processor 110 with memory 120. Memory 120 may be a non-transitory memory, such as non-volatile random-access memory (NVRAM), including machine-readable instructions that when executed by processor 110, may cause processor 110 to perform one or more actions as described herein.

DMA control circuit 130 may be coupled to bus 140 to allow for data transfer between the devices coupled to bus 140, including processor 110 and peripheral devices 180a through 180n. DMA control circuit 130 may also be coupled with memory 120 via bus 170. DMA control circuit 130 may receive a plurality of control signals 150 from processor 110. System 100 may allow for data transfer by DMA control circuit 130 without processor 110 between any of peripheral devices 180a through 180n coupled with bus 140 as well as between peripheral devices 180a through 180n and memory 120 or within memory 120. Processor 110 may initialize DMA control circuit 130 and once DMA control circuit 130 is programmed, DMA control circuit 130 may conduct data transfer without the aid of processor 110. Processor 110 may then be free to perform other tasks.

Figure 2:
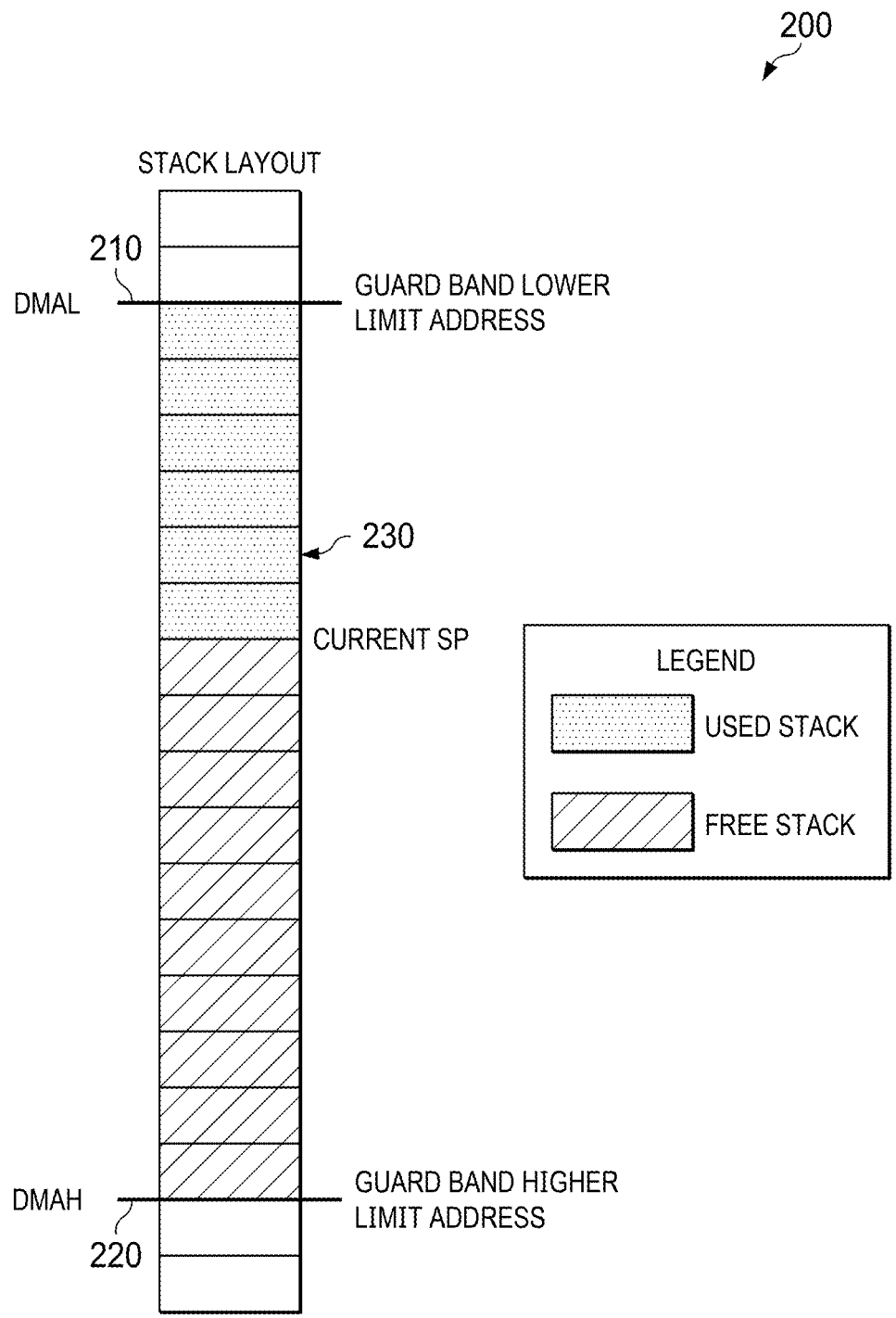
FIG. 2 is an illustration of a DMA control circuit stack layout, according to examples of the present disclosure.

FIG. 2 is an illustration of a DMA control circuit stack layout, according to examples of the present disclosure. As functions are added to DMA control circuit stack 200, DMA control circuit stack 200 increases and as functions are completed, DMA control circuit stack 200 decreases. The DMA control circuit, such as DMA control circuit 130 shown in FIG. 1, may be set up with registers used to periodically determining a stack error using a DMA call. For example, register DMAL may be used to store guard band lower limit address 210 below which an interrupt will be triggered if the DMA control circuit initiates a data transfer. Register DMAH may be used to store guard band higher limit address 220 above which an interrupt will be triggered when the DMA control circuit initiates a data transfer. Registers DMAL and DMAH may be used to store an address at which, if the current stack pointer is beyond the address, indicates when DMA control circuit stack 200 is in an underflow or overflow condition, respectively. Another DMA register, DMASRC may be used to store the address location from which the DMA control circuit initiates a read operation. Additional DMA registers may include DMACNT to store the quantity of remaining data to be transferred by the DMA control circuit; DMADST to store the destination address location to which the DMA control circuit initiates a write operation; and DMABUF to store an internal data buffer that holds the data being transferred from DMASRC to DMADST. Initially, the DMA control circuit may set up the registers such that DMASRC may be set to the current stack pointer 230, DMADST may be set to DMABUF, and DMACNT may be set to the difference between a guard band limit address and DMASRC. The DMA control circuit 130 may use a first channel for detecting a DMA underflow condition and a second channel for detecting a DMA overflow condition. On the channel performing a method for detecting a DMA underflow condition, DMACNT may be set to the difference between DMASRC and DMAL and on the channel performing a method for detecting a DMA overflow condition, DMACNT may be set to the difference between DMAH and DMASRC. The DMAH, DMAL, and DMABUF registers may be common across all DMA channels.

If a processor, such as processor 110 shown in FIG. 1, initiates a DMA call (e.g., a data transfer) that may result in the current stack pointer exceeding DMAH or falling below DMAL, the DMA control circuit 130 may generate an interrupt to the processor 110 to alert the processor 110 of this stack overflow or underflow condition. The DMA control circuit 130 may use a first channel for detecting a DMA underflow condition and a second channel for detecting a DMA overflow condition. DMA control circuit 130 may use round robin scheduling to scan the channels such that both the upper limit and the lower limit of DMA control circuit stack 200 are monitored. The use of the DMA registers and the detection of DMA stack underflow or overflow conditions are explained in more detail with respect to FIGS. 3-7.

As an example, guard band lower limit address 210 (stored in register DMAL) may be set at 0x1000, and guard band higher limit address 220 (stored in register DMAH) may be set at 0x2000.

In this example, current stack pointer 230 may be 0x1500. Register DMASRC may be initialized to current stack pointer 230 (i.e., 0x1500), register DMADST may be set to the DMABUF register address and may be used to store the data transferred. The DMACNT register may be set to the difference between guard band higher limit address 220 (e.g., DMAH) and current stack pointer 230 (e.g., DMASRC), which in this example is 0x2000-0x1500, which equals 0xB00. The value of DMACNT indicates the amount of data to be transferred during the DMA call. Once the DMA call is triggered, the amount of data from the DMASRC register may be transferred to the DMADST register. In this example, the DMA call will transfer 0xB00 bytes of data to the DMABUF register. The DMACNT register may be decreased as data is transferred. When the DMACNT register reaches zero, a DONEIF DMA complete operation interrupt flag may be sent to the processor 110 to trigger a DMACOMPLETE interrupt service routine (ISR). In the DMACOMPLETE ISR, the processor 110 may load the DMASRC register with the current stack pointer. If, for example, the current stack pointer has increased to 0x1800, the DMASRC register then be set to 0x1800, and the DMACNT register will be reduced to 0x2000-0x1800, e.g., 0x800. This time, when the DMA call is initiated, the DONEIF DMA complete operation interrupt flag will be sent to the processor sooner because the number of bytes of data transferred is less than in the previous DMA call. As the current stack pointer continues to increase, eventually DMASRC will exceed DMAH, indicating that a stack overflow condition has occurred, triggering a HIGHIF interrupt flag from the DMA control circuit to the processor. After receiving the HIGHIF, the processor may run a DMAHIGH ISR to capture the identity of the program counter at which the stack overflow condition occurred.

Figure 3:
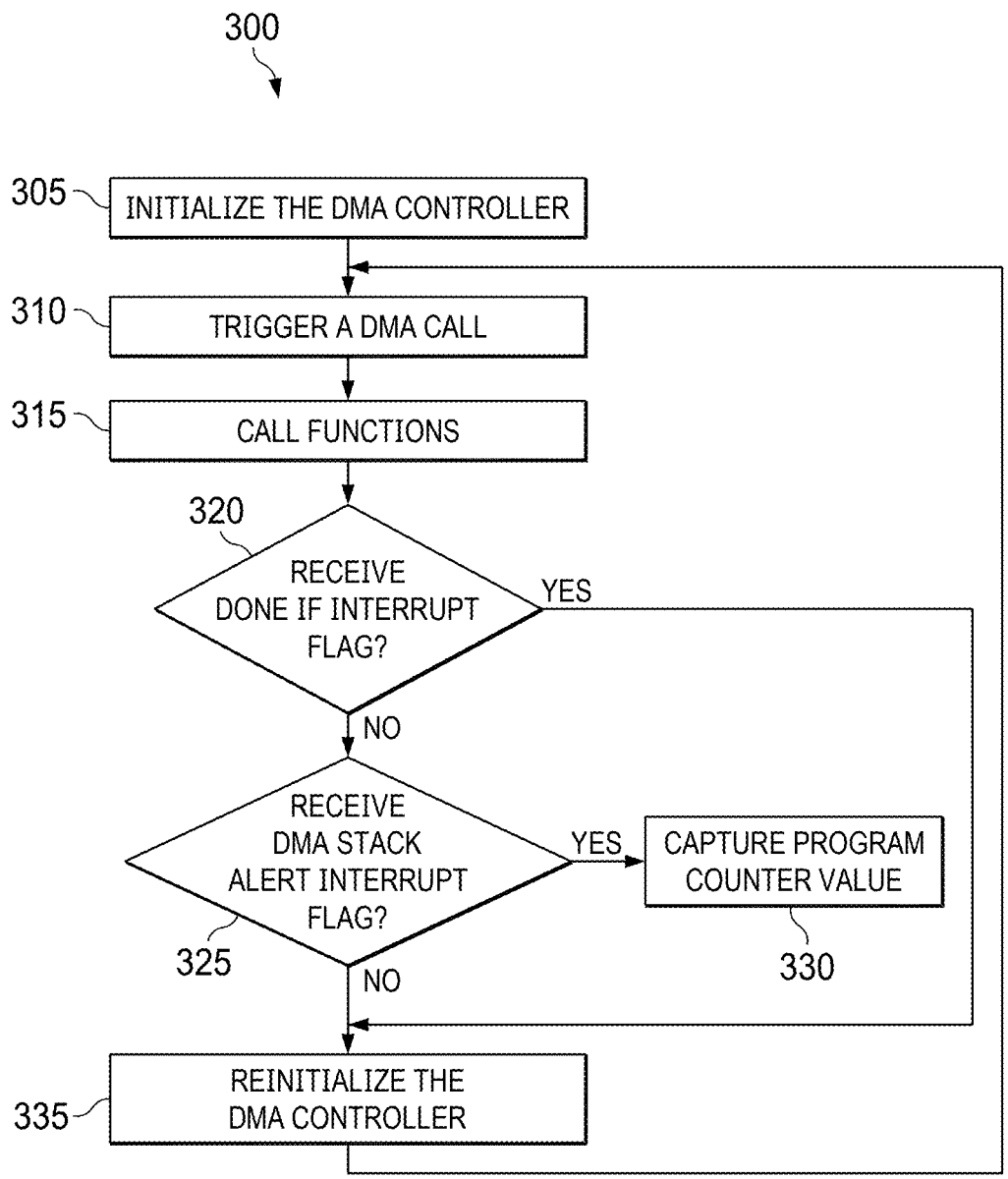
FIG. 3 illustrates a method for periodically determining a stack error using a DMA call, according to examples of the present disclosure.

FIG. 3 illustrates a method for periodically determining a stack error using a DMA call, according to examples of the present disclosure. Method 300 may be implemented using a processor, such as processor 110 shown in FIG. 1, or any other system operable to implement method 300. Method 300 may be implemented as a software algorithm included as a part of a functional safety diagnostics package for the stack module of the DMA. Method 300 may use one channel of the DMA control circuit. Although examples have been described above, other variations and examples may be made from this disclosure without departing from the spirit and scope of these disclosed examples.

Method 300 may begin at block 305 where a processor may initialize a DMA control circuit. The initialization process may include initializing the DMA control circuit to transfer data from the current stack pointer to a buffer register in the DMA control circuit which may be referred to as the DMABUF register. The DMA control circuit may be configured such that, as data is transferred, the count, tracked in the DMACNT register, is decremented. Additionally, the processor may initialize other DMA registers including, but not limited to, the DMASRC register, the DMADST register, the DMAH register, the DMAL register, and the DMACNT register. For example, the processor may set the DMASRC register to the current stack pointer, the DMADST register to the DMABUF register, the DMAH register to the upper address limit location above which an interrupt will be triggered indicating a stack overflow (e.g., guard band higher limit address 220 shown in FIG. 2), the DMAL register to the lower address limit location below which an interrupt will be triggered indicating a stack underflow (e.g., guard band lower limit address 210 shown in FIG. 2), and the DMACNT register to the difference between a guard band limit address (e.g., either DMAH or DMAL) and the current stack pointer. When performing a method for detecting a DMA underflow condition, DMACNT may be set to the difference between DMASRC and DMAL and when performing a method for detecting a DMA overflow condition, DMACNT may be set to the difference between DMAH and DMASRC.

At block 310, the processor may trigger a DMA transfer by sending a DMA call command to the DMA control circuit.

At block 315, the processor may call one or more functions. Block 315 may be performed in parallel or in series with the DMA transfer triggered at block 310. The processor may continue to execute any number of function calls until it receives an interrupt indicating that the DMA transfer is complete (block 320) or an interrupt indicating that a stack overflow or stack underflow condition has occurred (block 325). Therefore, the process of periodically determining a stack error using a DMA call occurs asynchronously with the functions of the processor.

At block 320, the processor may receive a DONEIF interrupt flag. The DONEIF interrupt flag may be sent to the processor from a DMA control circuit when the DMA control circuit completes the DMA transfer triggered by the processor at block 310. After receiving a DONEIF interrupt flag, the processor may execute an DMACOMPLETE interrupt service routine (ISR) at block 330, described below.

At block 325, the processor may receive a DMA stack alert interrupt flag. Specifically, the DMA control circuit may trigger a HIGHIF interrupt flag to the processor to indicate that DMASRC has crossed DMAH, as described in more detail with respect to FIG. 4. Alternatively, the DMA control circuit may trigger a LOWIF interrupt flag to the processor to indicate that DMASRC has crossed DMAL, as described in more detail with respect to FIG. 5. The HIGHIF interrupt flag may indicate to the processor that a stack overflow condition has occurred and the LOWIF interrupt flag may indicate to the processor that a stack underflow condition has occurred.

At block 330, after receiving a DMA stack alert interrupt flag (block 325), the processor may initiate an ISR to capture the program counter value around which the stack overflow or underflow condition occurred. Specifically, the processor may initiate a DMAHIGH ISR to capture the program counter value around which the stack overflow condition occurred, in the event that a HIGHIF interrupt flag was triggered. Alternatively, the processor may initiate a DMALOW ISR to capture the program counter value around which the stack underflow condition occurred, in the event that a LOWIF interrupt flag was triggered. The program counter value may be part of the current stack. Additionally, the program counter value may be used to identify a piece of code that may be causing the stack overflow condition such that a software developer may take corrective action.

At block 335, the processor may reinitialize the DMA control circuit. Specifically, the processor may reload the DMASRC to equal the current stack pointer, set DMADST to DMABUF, set DMACNT to the difference between DMAH and the current stack pointer, and set DMACNT to the difference between the current stack pointer and DMAL. The processor may be reloaded and reset the DMASRC, DMADST, and DMACNT registers because the current stack pointer may have moved or increased. For example, as the current stack pointer increases, the size of DMACNT (e.g., the difference between DMAH and the current stack pointer) will decrease. Method 300 may return to block 310 where the processor may then trigger another DMA transfer.

Although FIG. 3 discloses a particular number of operations related to method 300, method 300 may be executed with greater or fewer operations than those depicted in FIG. 3. In addition, although FIG. 3 discloses a certain order of operations to be taken with respect to method 300, the operations comprising method 300 may be completed in any suitable order.

Figure 4:
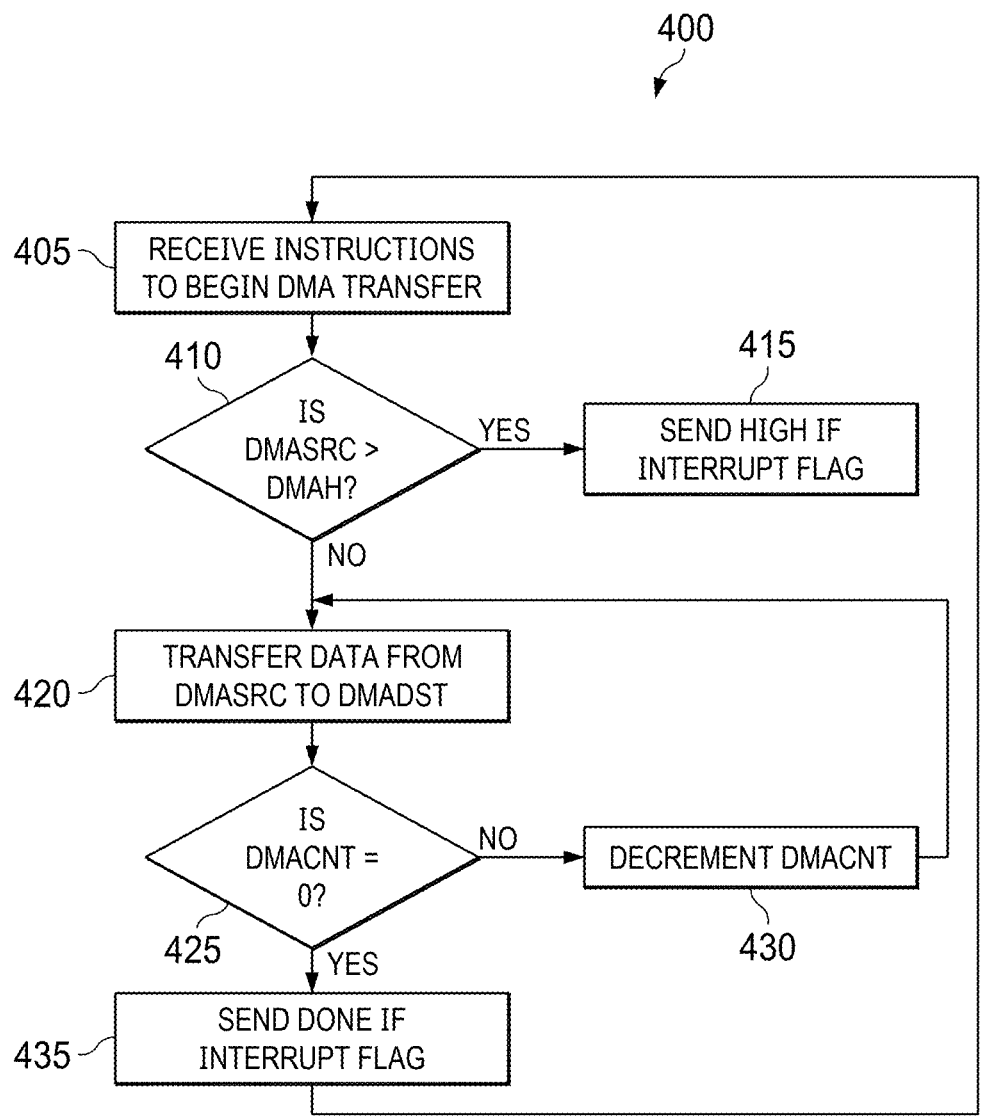
FIG. 4 illustrates a method for periodically determining a stack overflow condition using a DMA call, according to examples of the present disclosure.

FIG. 4 illustrates a method for periodically determining a stack overflow condition using a DMA call, according to examples of the present disclosure. Method 400 may be implemented using a DMA control circuit or any other system operable to implement method 400. Method 400 may be implemented as a software algorithm included as a part of a functional safety diagnostics package for the stack module of the DMA control circuit. Method 400 may use one channel of the DMA control circuit. Although examples have been described above, other variations and examples may be made from this disclosure without departing from the spirit and scope of these disclosed examples.

At block 405, the DMA control circuit may receive instructions (e.g., a DMA call) from a processor to begin a DMA transfer.

At block 410, the DMA control circuit may determine whether DMASRC is greater than DMAH. If DMASRC exceeds DMAH, the DMA control circuit may detect that a stack overflow has occurred. At block 415, the DMA control circuit may trigger a HIGHIF interrupt flag to the processor to indicate that DMASRC has crossed DMAH. If DMASRC does not exceed DMAH, method 400 proceeds to block 420.

At block 420, the DMA control circuit may transfer data from a source (the DMASRC register) to a destination (the DMADST register).

At block 425, the DMA control circuit may determine whether the DMACNT register value equals zero. If the DMACNT equals zero, at block 435, the DMA control circuit may trigger a DONEIF interrupt flag to the processor to indicate that the DMA transfer is complete. After sending the DONEIF interrupt flag, method 400 may return to block 405 to receive instructions to begin another DMA transfer. If the DMACNT does not equal zero, the DMA control circuit may decrement DMACNT at block 430 and method 400 returns to block 420 to continue transferring data from a source to a destination.

Because the size of the DMA transfer is based on the difference between the guard band higher limit address and the current stack pointer (e.g., DMACNT), the size of the DMA transfer instructed at block 405 may decrease through method 400, when the current stack pointer is approaching DMAH, the guard band higher limit address. The size of the data to be transferred decreases in proportion to the difference between the limit of the stack and the current stack pointer. Additionally, the frequency of DONEIF interrupt flag (sent at block 435) may increase as the size of the data being transferred decreases because a given transfer may be completed in less time and another DMA call initiating another DMA transfer may be initiated, resulting in another DONEIF interrupt flag. Therefore, method 400 tracks the current stack pointer more closely as it approaches DMAH (e.g., a stack overflow condition) by initiating DMA calls (which compare the current stack pointer to DMAH) more frequently.

Although FIG. 4 discloses a particular number of operations related to method 400, method 400 may be executed with greater or fewer operations than those depicted in FIG. 4. In addition, although FIG. 4 discloses a certain order of operations to be taken with respect to method 400, the operations comprising method 400 may be completed in any suitable order.

Figure 5:
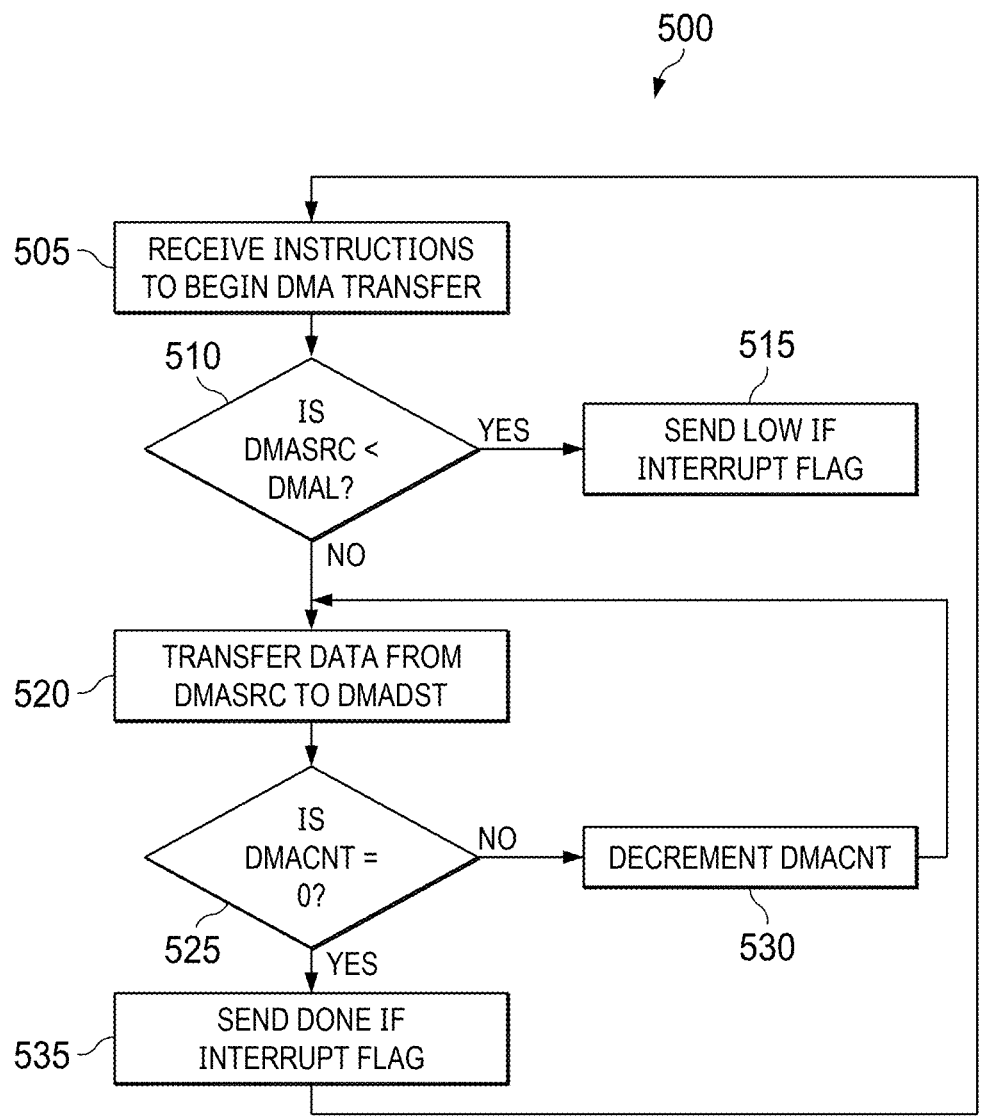
FIG. 5 illustrates a method for periodically determining a stack underflow condition using a DMA call, according to examples of the present disclosure.

FIG. 5 illustrates a method for periodically determining a stack underflow condition using a DMA call, according to examples of the present disclosure. Method 500 may be implemented using a DMA control circuit or any other system operable to implement method 500. Method 500 may be implemented as a software algorithm included as a part of a functional safety diagnostics package for the stack module of the DMA control circuit. Method 500 may use one channel of the DMA control circuit, which may be different from the channel used to perform method 400 described with respect to FIG. 4. Although examples have been described above, other variations and examples may be made from this disclosure without departing from the spirit and scope of these disclosed examples.

At block 505, the DMA control circuit may receive instructions (e.g., a DMA call) from a processor to begin a DMA transfer.

At block 510, the DMA control circuit may determine whether DMASRC is less than DMAL. If DMASRC is below DMAL, the DMA control circuit may detect that a stack underflow has occurred. At block 515, the DMA control circuit may trigger a LOWIF interrupt flag to the processor to indicate that DMASRC has crossed DMAL. If DMASRC is not below DMAL, method 500 proceeds to block 520.

At block 520, the DMA control circuit may transfer data from a source (the DMASRC register) to a destination (the DMADST register).

At block 525, the DMA control circuit may determine whether the DMACNT register value equals zero. If the DMACNT equals zero, at block 535, the DMA control circuit may trigger a DONEIF interrupt flag to the processor to indicate that the DMA transfer is complete. After sending the DONEIF interrupt flag, method 500 may return to block 505 to receive instructions to begin another DMA transfer. If the DMACNT does not equal zero, the DMA control circuit may decrement DMACNT at block 530 and method 500 returns to block 520 to continue transferring data from a source to a destination.

Because the size of the DMA transfer is based on the difference between the current stack pointer and the guard band lower limit address (e.g., DMACNT), the size of the DMA transfer instructed at block 505 may decrease through method 500, when the current stack pointer is approaching DMAL, the guard band lower limit address. Additionally, the frequency of DONEIF interrupt flag (sent at block 535) may increase as the size of the data being transferred decreases because a given transfer may be completed in less time and another DMA call initiating another DMA transfer may be initiated, resulting in another DONEIF interrupt flag. Therefore, method 500 tracks the current stack pointer more closely as it approaches DMAL (e.g., a stack underflow condition) by initiating DMA calls (which compare the current stack pointer to DMAH) more frequently.

Although FIG. 5 discloses a particular number of operations related to method 500, method 500 may be executed with greater or fewer operations than those depicted in FIG. 5. In addition, although FIG. 5 discloses a certain order of operations to be taken with respect to method 500, the operations comprising method 500 may be completed in any suitable order.

Figure 6:
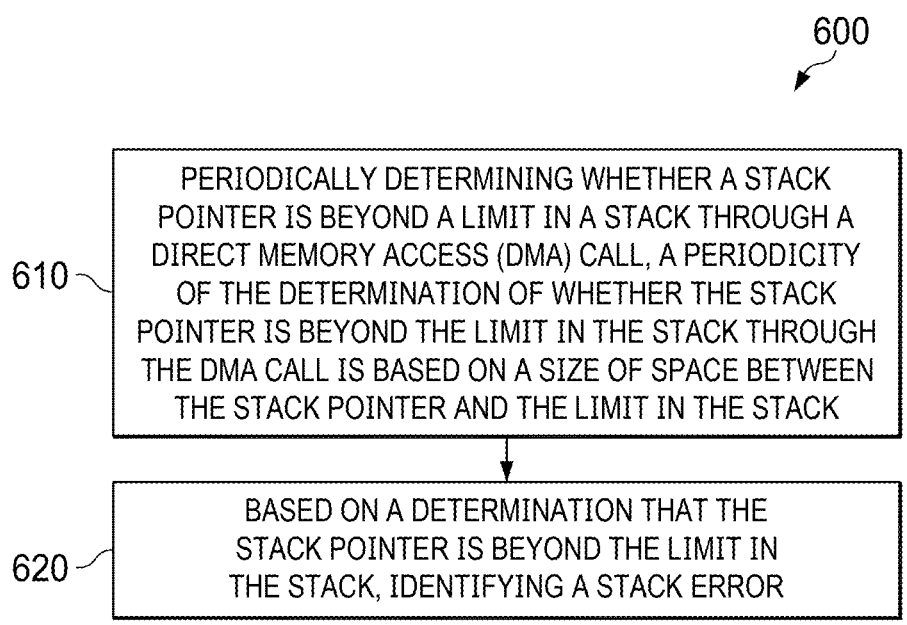
FIG. 6 illustrates a method for periodically determining a stack underflow or overflow condition using a DMA call, according to examples of the present disclosure.

FIG. 6 illustrates a method for periodically determining a stack underflow or overflow condition using a DMA call, according to examples of the present disclosure. Method 600 may be implemented using a DMA control circuit, a processor, or any other system operable to implement method 600. Method 600 may be implemented as a software algorithm included as a part of a functional safety diagnostics package for the stack module of the DMA control circuit. Although examples have been described above, other variations and examples may be made from this disclosure without departing from the spirit and scope of these disclosed examples.

At block 610, method 600 may periodically determine whether a stack pointer is beyond a limit in a stack through a direct memory access (DMA) call. The periodicity of the determination of whether the stack pointer is beyond the limit in the stack through the DMA call may be based on a size of space between the stack pointer and the limit in the stack. Specifically, registers may be initialized such that the data to be transferred using the DMA call is sized based on the difference between the stack pointer and the limit of the stack, both an upper limit and a lower limit, as described with respect to block 305 in FIG. 3. As the difference between the stack pointer and the limit of the stack becomes smaller, the periodicity of the determination increases. As a result, as the stack pointer approaches a limit, method 600 determines whether the stack pointer is beyond a limit more frequently.

At block 620, method 600 may identify a stack error based on a determination that the stack pointer is beyond the limit in the stack. Specifically, as described with respect to FIGS. 4 and 5, a DMA control circuit may determine whether the current stack pointer is beyond an upper limit or below a lower limit and trigger an interrupt flag to alert a processor of a stack error.

Although FIG. 6 discloses a particular number of operations related to method 600, method 600 may be executed with greater or fewer operations than those depicted in FIG. 6. In addition, although FIG. 6 discloses a certain order of operations to be taken with respect to method 600, the operations comprising method 400 may be completed in any suitable order.

FIG. 7 illustrates a method for periodically determining a stack underflow or overflow condition using a DMA call, according to examples of the present disclosure. Method 700 may be implemented using a DMA control circuit, a processor, or any other system operable to implement method 700. Method 700 may be implemented as a software algorithm included as a part of a functional safety diagnostics package for the stack module of the DMA control circuit. Although examples have been described above, other variations and examples may be made from this disclosure without departing from the spirit and scope of these disclosed examples.

Method 700 may begin at block 702, where method 700 may determine a duration of time to perform the DMA call based on the size of space between the stack pointer and the limit in the stack. The amount of data transferred during the DMA call may be based on the difference between the stack pointer and the limit on the stack, whether an upper limit or a lower limit. The duration of time to perform the DMA call may be related to the amount of data to be transferred and may be in proportion to the difference between the limit of the stack and the current stack pointer (e.g., the larger the difference between the limit of the stack and the current stack pointer, the larger the duration of time to perform the DMA call).

At block 704, method 700 may set, prior to performing the DMA call, a DMA register value to a difference between the limit in the stack and the stack pointer. Specifically, a processor may set a DMACNT register to the difference between a guard band limit address (e.g., either DMAH or DMAL) and the current stack pointer, as described with respect to block 305 in FIG. 3. When performing a method for detecting a DMA underflow condition, DMACNT may be set to the difference between DMASRC and DMAL and when performing a method for detecting a DMA overflow condition, DMACNT may be set to the difference between DMAH and DMASRC.

At block 706, method 700 may set a periodicity of determining whether a stack pointer is beyond a limit according to the duration of time to perform the DMA call. The duration of time may be determined at block 702.

At block 710, method 700 may perform the DMA call by transferring data to a DMA register. The size of the data to be transferred may decrease in proportion to a difference between the limit in the stack and the stack pointer. For example, the size of data to be transferred may be equal to the difference between the current stack pointer and the limit in the stack.

At block 715, method 700 may update, after the DMA call is completed, the DMA register value to a new difference between the limit in the stack and the stack pointer. As the DMA control circuit completes tasks, the stack pointer may change and the difference between the stack pointer and the limits of the stack may also change. The DMA register value may be updated to reflect the change, as described with respect to block 335 in FIG. 3.

At block 720, method 700 may periodically determine whether a stack pointer is beyond a limit in a stack through a direct memory access (DMA) call. The periodicity of the determination of whether the stack pointer is beyond the limit in the stack through the DMA call may be based on a size of space between the stack pointer and the limit in the stack. Specifically, registers may be initialized such that the data to be transferred using the DMA call is sized based on the difference between the stack pointer and the limit on the stack, both an upper limit and a lower limit, as described with respect to block 305 in FIG. 3. As the difference between the stack pointer and the limit of the stack becomes smaller, the periodicity of the determination increases. As a result, as the stack pointer approaches a limit, method 600 determines whether the stack pointer is beyond a limit more frequently.

At block 725, method 700 may identify a stack error based on a determination that the stack pointer is beyond the limit in the stack. Specifically, as described with respect to FIGS. 4 and 5, a DMA control circuit may determine whether the current stack pointer is beyond an upper limit or below a lower limit and raise an interrupt flag to alert a processor of a stack error. The processor may continue to call functions while the DMA control circuit may perform the DMA call, as described with respect to block 315 in FIG. 3. When the DMA control circuit identifies a stack error, the DMA control circuit may raise an interrupt flag to alert the processor of a stack error, as described with respect to block 325 in FIG. 3, blocks 410 and 415 in FIG. 4, and blocks 510 and 515 in FIG. 5.

At block 730, method 700 may determine whether the limit is a lower limit and, if so, at block 735, method 700 may identify the stack error as an underflow condition.

At block 740, method 700 may determine whether the limit is an upper limit and, if so, at block 745, method 700 may identify the stack error as an overflow condition.

Although FIG. 7 discloses a particular number of operations related to method 700, method 700 may be executed with greater or fewer operations than those depicted in FIG. 7. In addition, although FIG. 7 discloses a certain order of operations to be taken with respect to method 700, the operations comprising method 400 may be completed in any suitable order.

Although specific names for DMA registers, interrupt flags, and ISRs are used throughout this disclosure, other names may be used without departing from the spirit and scope of the disclosed examples.

Although examples have been described above, other variations and examples may be made from this disclosure without departing from the spirit and scope of these disclosed examples.

The invention claimed is:

1. A method, comprising:
    periodically determining whether a stack pointer is beyond a limit in a stack through a direct memory access (DMA) call; and
    identifying a stack error based on a determination that the stack pointer is beyond the limit in the stack;
    wherein a periodicity of the determination of whether the stack pointer is beyond the limit in the stack through the DMA call is based on a size of space between the stack pointer and the limit in the stack.

2. The method of claim 1, wherein the limit is a lower limit and the stack error is an underflow.

3. The method of claim 1, wherein the limit is an upper limit and the stack error is an overflow.

4. The method of claim 1, comprising:
    determining a time to perform the DMA call based on the size of space between the stack pointer and the limit in the stack; and
    setting the periodicity according to the time to perform the DMA call.

5. The method of claim 1, wherein the determination of whether the stack pointer is beyond the limit in the stack through the DMA call is performed asynchronously while a processor executes other functions.

6. The method of claim 1, wherein:
    the DMA call transfers data to a DMA register; and
    a size of data to be transferred decreases in proportion to a difference between the limit in the stack and the stack pointer.

7. The method of claim 1, comprising:
    setting, prior to performing the DMA call, a DMA register value to a difference between the limit in the stack and the stack pointer; and
    updating, after the DMA call is completed, the DMA register value to a new difference between the limit in the stack and the stack pointer.

8. An apparatus, comprising:
    a direct memory access (DMA) control circuit to:
        periodically determine whether a stack pointer is beyond a limit in a stack through a DMA call; and
        identify a stack error based on a determination that the stack pointer is beyond the limit in the stack;
        wherein a periodicity of the determination of whether the stack pointer is beyond the limit in the stack through the DMA call is based on a size of space between the stack pointer and the limit in the stack.

9. The apparatus of claim 8, wherein the limit is a lower limit and the stack error is an underflow.

10. The apparatus of claim 8, wherein the limit is an upper limit and the stack error is an overflow.

11. The apparatus of claim 8, wherein the DMA control circuit is to:
   determine a time to perform the DMA call based on the size of space between the stack pointer and the limit in the stack; and
   set the periodicity according to the time to perform the DMA call.

12. The apparatus of claim 8, wherein the determination of whether the stack pointer is beyond the limit in the stack through the DMA call is performed asynchronously while a processor executes other functions.

13. The apparatus of claim 8, wherein:
   the DMA call transfers data to a DMA register; and
   a size of data to be transferred decreases in proportion to a difference between the limit in the stack and the stack pointer.

14. The apparatus of claim 8, the DMA control circuit to:
   set a DMA register value to a difference between the limit in the stack and the stack pointer; and
   update the DMA register value after the DMA call is completed.

15. An article of manufacture comprising:
   a non-transitory memory including machine-readable instructions that, when executed by a processor, cause the processor to:
      periodically determine whether a stack pointer is beyond a limit in a stack through a direct memory access (DMA) call; and
      identify a stack error based on a determination that the stack pointer is beyond the limit in the stack;
      wherein a periodicity of the determination of whether the stack pointer is beyond the limit in the stack through the DMA call is based on a size of space between the stack pointer and the limit in the stack.

16. The article of manufacture of claim 15, wherein the limit is a lower limit and the stack error is an underflow.

17. The article of manufacture of claim 15, wherein the limit is an upper limit and the stack error is an overflow.

18. The article of manufacture of claim 15, wherein the machine-readable instructions cause the processor to:
   determine a time to perform the DMA call based on the size of space between the stack pointer and the limit in the stack; and
   set the periodicity according to the time to perform the DMA call.

19. The article of manufacture of claim 15, wherein:
   the DMA call transfers data to a DMA register; and
   a size of data to be transferred decreases in proportion to a difference between the limit in the stack and the stack pointer.

20. The article of manufacture of claim 15, wherein the machine-readable instructions cause the processor to:
   set a DMA register value to a difference between the limit in the stack and the stack pointer; and
   update the DMA register value after the DMA call is completed.

\* \* \* \* \*